US006485106B1

(12) United States Patent
Hermansen et al.

(10) Patent No.: US 6,485,106 B1
(45) Date of Patent: Nov. 26, 2002

(54) SIZE ADJUSTABLE WHEEL RIM MASKS (76) Inventors: Brett Lee Hermansen, 12101 Mill Ridge Rd., Sandy, UT (US) 84094; Steven Glen Van Woerkom, 2786 E. Amberwick La., Sandy, UT (US) 84093

( * ) Notice: Subject to any disclaimer, the term of this patent is extended or adjusted under 35 U.S.C. 154(b) by 0 days.

(21) Appl. No.: 09/443,717

(22) Filed: Nov. 19, 1999

(51) Int. Cl.[7] .................................................. B60B 7/00
(52) U.S. Cl. ............................ 301/37.103; 301/37.104
(58) Field of Search .......................... 301/37.1, 37.22, 301/37.42, 37.41

(56) References Cited

U.S. PATENT DOCUMENTS

| 1,481,363 | A | * | 1/1924 | Hall | 301/37.1 |
| 2,503,988 | A | * | 4/1950 | Arbib | 301/37.1 |
| D159,822 | S | * | 8/1950 | Lyon | 301/37.1 |
| D165,083 | S | * | 11/1951 | Lyon | 301/37.1 |
| D165,181 | S | * | 11/1951 | Lyon | 301/37.1 |
| 2,660,823 | A | * | 12/1953 | Dubin et al. | 301/37.1 |
| 2,726,634 | A | | 12/1955 | Horner | 118/505 |
| 3,167,358 | A | * | 1/1965 | Demrick | 301/37.1 |
| 3,178,231 | A | * | 4/1965 | Hezler, Jr. | 301/37.1 |
| 3,319,687 | A | * | 5/1967 | Tomchak | 301/37.1 |
| 3,854,448 | A | * | 12/1974 | Kromanaker | 301/37.1 |
| 3,894,775 | A | * | 7/1975 | Christoph et al. | 301/37.1 |
| 4,004,837 | A | * | 1/1977 | Main | 301/37.1 |
| 4,190,939 | A | | 3/1980 | Keller | 29/451 |
| 4,344,654 | A | * | 8/1982 | Apezynski | 301/37.28 |
| 4,406,246 | A | | 9/1983 | DeMeyer et al. | 118/505 |
| 4,784,440 | A | * | 11/1988 | Fair | 301/37.1 |
| 4,792,191 | A | * | 12/1988 | Farmer | 310/37.1 |
| 4,811,991 | A | | 3/1989 | Moreno et al. | 301/37 |
| 4,874,206 | A | * | 10/1989 | Sampson | 301/37.1 |
| D305,635 | S | | 1/1990 | Pope | D12/213 |
| 4,955,670 | A | * | 9/1990 | Koller | 301/37.1 |
| 5,044,688 | A | * | 9/1991 | Jacobson | 296/136 |
| D337,090 | S | | 7/1993 | Wilfong, III | D12/213 |
| D338,185 | S | | 8/1993 | Dowd | D12/213 |
| 5,366,278 | A | * | 11/1994 | Brumfield | 301/37.34 |
| 5,423,599 | A | * | 6/1995 | Sherod et al. | 301/37.1 |
| 5,460,402 | A | * | 10/1995 | Rhodes, Jr. | 280/728.3 |
| 5,524,972 | A | * | 6/1996 | Cailor et al. | 301/37.42 |
| D379,171 | S | | 5/1997 | Hope et al. | D12/213 |
| D387,725 | S | | 12/1997 | Cochran et al. | D12/213 |
| 5,743,154 | A | * | 4/1998 | Jacinth | 74/558 |
| 5,759,276 | A | | 6/1998 | Addison, Jr. | 118/504 |
| 5,785,389 | A | | 7/1998 | Bradford | 301/37.42 |
| 5,931,543 | A | * | 8/1999 | Smith | 301/37.28 |
| 5,962,072 | A | | 10/1999 | Yerman | 427/282 |
| 6,044,968 | A | * | 4/2000 | Iampen | 301/37.1 |
| 6,068,345 | A | * | 5/2000 | Bressie | 301/37.1 |

* cited by examiner

*Primary Examiner*—S. Joseph Morano
*Assistant Examiner*—Long Nguyen
(74) *Attorney, Agent, or Firm*—Workman, Nydegger & Seeley (57) ABSTRACT

Size-adjustable wheel rim protective masks for protecting a wheel rim from overspray during application of tire dressing to the surrounding tire. A generally flat, circular disk is provided having a radial gap, such as a slit, so as to be reconfigurable into a plurality of cone-shaped configurations corresponding in size to a wheel rim to be protected. An adjustment locking mechanism is provided for locking the circular disk into a desired cone shaped configuration. The locking mechanism may comprise mateable male and female snaps, a tab and recess system, a hook and loop system, adhesive tape, a belt and buckle system, a ratchet band and clasp system, or other locking mechanisms known in the art. A pair of finger holes or a handle structure facilitates gripping of the protective mask during use. The disk is preferably made from a water and chemical resistant material such as plastic.

17 Claims, 5 Drawing Sheets

SIZE ADJUSTABLE WHEEL RIM MASKS

BACKGROUND OF THE INVENTION

1. The Field of the Invention

The present invention is in the field of protective wheel rim masks used to shield or protect a wheel rim when applying a liquid dressing to a tire. More particularly, the present invention relates to adjustable protective wheel rim masks that can be size customized in order to protect wheels of varying diameter.

2. The Relevant Technology

It is become common practice during detailing of cars, trucks, and other vehicles to beautify the tires by applying a liquid dressing thereto in order to clean, darken and shine the tires, thereby giving the tires a newer, more classy, appearance. In addition to enhancing the appearance of the tires and overall vehicle, the tire dressing can also protect and prolong the life of the tires.

A typical tire dressing comprises a water-in-oil emulsion having a milky appearance and including a special oil-based protectant. One such tire dressing is sold under the trademark ARMORALL®, a trademark of the McKesson Corporation, located in Irvine, Calif.

A popular method for applying tire dressings in liquid form is from a spray bottle. While this application method is efficient in placing a desired quantity of the tire dressing over a broad area in a short period of time, it nevertheless can create a problem of overspray. That is, spraying of the tire often inadvertently results in spraying of the metal wheel rim, thus leaving an undesired oily residue on the tire rim. Because the tire dressing is generally brake dust and road grime, all of which quickly make the wheel rim unsightly. Moreover, the oily tire dressing often becomes gummy and difficult to remove, thus requiring the use of strong detergents and vigorous scrubbing. This, ironically, usually has the effect of stripping off the tire dressing from the tire, thus undermining the whole purpose for applying the tire dressing in the first place.

In order to provide the user with the ability to mask or protect the wheel rim during the application of a tire dressing, several wheel rim covers have been proposed. Wheel rim covers such as those disclosed in U.S. Pat. No. 5,524,972 to Cailor et al. and U.S. Pat. No. 4,811,991 to Marino et al. are hand-held devices that can be held in place over the wheel rim with one hand while the user applies tire dressing to the tire with the other. U.S. Pat. No. 4,874,206 to Sampson, U.S. Pat. No. 5,423,599 to Sherod et al., and U.S. Pat. No. 4,955,670 to Koller disclose wheel rim covers that include attachment means so that such protective covers can be secured to the wheel rim to free up both hands of the user.

Whereas any of the foregoing wheel rim covers may provide adequate protection from tire dressing being applied to the wheel rim, such protective covers are not readily adjustable to fit a plurality of differently sized wheel rims. Whereas U.S. Pat. Nos. 5,524,972, 4,955,670 and 4,874,206 purport to disclose "adjustable" wheel rim covers, the so-called "adjustability" of such wheel rim covers is provided by the requirement that the user cut away a predetermined portion of the outer circumference in order for the wheel cover to "adjust" to, and thereby fit, a particular wheel rim size. Unfortunately, such "adjustment" is one way. Once "adjusted" to fit a smaller wheel rim, such wheel rim covers cannot later be "re-adjusted" so as to fit larger wheel rims. Thus, a person will not be able to repeatedly use such wheel rim covers for differently-sized wheels, thus realistically requiring a person to purchase multiple wheel rim covers, one for each size wheel, if the person owns multiple cars having differing wheel rim sizes. Moreover, trimming away a portion of the wheel rim cover can be tedious, inexact, and result in the formation of sharp or jagged edges.

In order to provide universal "adjustability", U.S. Pat. No. 5,785,389 to Bradford discloses a hand held wheel cover that essentially comprises a pie-shaped wedge portion attached to a handle. In use, the Bradford cover is rotated around the edge of the tire rim in order to provide localized protection from tire dressing overspray. However, protecting the rim using the device of Bradford appears to be both cumbersome and inexact, since the user is required to move the pie-shaped wedge portion around the entire 360° of the wheel rim. Thus, whatever convenience is provided by the "adjustability" feature of the Bradford device is offset by the necessity to rotate the Bradford device between each squirt of tire dressing. Thus, the Bradford device does not allow for a single masking step followed by spraying tire dressing on the entire tire, but requires a step-wise application.

In view of the foregoing, it would be an advancement in the art to provide an improved wheel rim protective mask that could be adjusted to protect a plurality of differently-sized wheel rims.

It would be an additional improvement in the art to provide wheel rim protective masks that could be adjusted both upwardly and downwardly in order to provide protection for both larger and smaller rims once the protective mask has been sized to fit an intermediate-sized rim.

It would be a further improvement in the art to provide a wheel rim protective mask that could be readily and repeatedly adjusted to fit a variety of differently-sized wheel rims with a minimum of effort.

Finally, it would be a tremendous improvement in the art to provide a wheel rim protective mask that provided for ease of adjustment but which was capable of covering and masking the entire wheel rim at the same time, and in a single placement step, prior to applying tire dressing to the entire tire.

Such adjustable wheel rim protective covers are disclosed in claims herein.

SUMMARY AND OBJECTS OF THE INVENTION

The present invention relates to adjustable wheel rim masks for protecting a wheel rim during the application of a tire dressing to the surrounding tire. More particularly, the present invention encompasses size-adjustable wheel rim masks that can be adjusted to fit a variety of differently-sized wheel rims with a minimum of effort. Once adjusted to an intermediate wheel rim size, the size adjustable wheel rim masks of the present invention are upwardly and downwardly adjustable to cover larger and smaller wheel rims, respectively.

In order to provide the aforementioned adjustability feature, the wheel rim masks of the present invention preferably comprise a generally circular disk or disk-like sheet made of a sufficiently durable and chemical resistant material so as to provide adequate protection of a wheel rim when a tire dressing is applied to the surrounding tire. The circular disk includes a radial gap, such as a slit, extending from at or near the center point to the outer circumferential edge in order to allow the two adjoining sides of the disk to overlap each other in order to form the disk into a cone or cone-shaped configuration. This has the effect of reducing the effective circumference and diameter of the resulting cone-shaped configuration compared to an original flat configuration. Depending on how far one side of the disk is overlapped over the other, the circumference and diameter of the resulting cone can vary as desired in order to match or correspond to the circumference of a particular wheel rim to be masked.

In order to lock the cone-shaped wheel mask in a desired configuration so as to have a desired circumference and diameter, an adjustment locking means is provided. In a preferred embodiment, the locking means comprises a series of snaps on one side of the radial gap that can mechanically interact with one or more corresponding snaps on the other side of the radial gap so as to "snap", and thereby lock, the cone in a particular configuration. For example, a series of male snaps may advantageously be spaced apart at a predetermined location near the outer circumferential edge of the disk-shaped structure on one side of the radial gap. On the other side of the radial gap a corresponding female snap may be oriented so as to enable the overlapping side of the disk to be locked in place relative to one of the spaced-apart male snaps.

The male snaps are preferably oriented so that selective engagement of the female snap with each of the male snaps yields a series of cone-shaped wheel rim mask configurations corresponding to known wheel rim sizes commonly used on cars, trucks or other vehicles. For example, the female snap might be caused to engage the first male snap closest to the radial gap so as to yield a wheel rim mask configuration corresponding to a 17 inch diameter wheel rim. Likewise, engaging the female snap with the second male snap may advantageously correspond to at 16 inch wheel rim, and so on. Because wheel rims can range anywhere from 13 to 21 inches in diameter for most vehicles, the adjustable wheel rim masks of the present invention may be configured so as to correspond to any or all of the available wheel rim sizes. In most cases, it will be preferable for the wheel rim masks of the present invention to be adjustable to cover at least the most conmmonly sized wheel rims, such as 14 inch, 15 inch, 16 inch and 17 inch wheel rims.

It should be appreciated that the adjustment locking means is not limited to the use of snaps, but may include any known attachment or fastening device known in the art. For example, a tab and recess arrangement can be used to lock the disk-shaped blank into a desired cone-shaped configuration. Due to the generally resilient and spring-like nature of the disk material, once formed into a desired configuration, the disk will tend to flex outwardly in order to urge and maintain the tab and recess in an interlocked orientation. This, in turn, maintains the cone-shaped wheel mask in a desired configuration. As with snaps, a series of holes or recesses can be provided in a spaced apart orientation so that, when interlocked with the tab, the disk will form a cone having a size corresponding to a desired wheel rim size. Alternatively, a series of tabs in a desired spaced-apart orientation may be provided, with a locking hole or recess corresponding thereto.

In another alternative embodiment, a hook and loop locking system (e.g. VELCRO®) can be used. In a "hook and loop" locking system, a patch of closely spaced "hooks" is provided on one surface of the disk on one side of the radial gap, and a corresponding patch of wool-like "loops" is provided on the opposite surface of the disk on the other side of the radial gap. Once the two sides of the disk are caused to overlap so as to form a cone structure, the two sides can be locked into a desired orientation by engaging at least a portion of the hook patch with at least a portion of the loop patch. In contrast to the use of snaps or a tab and recess system, a hook and loop system allows for micro-adjustability of the cone to virtually any size within the range of possible sizes. On the other hand, snaps allow for predetermined cone adjustments in order to provide an exact size each time.

Alternatively, the adjustment locking means may comprise adhesive tape, a belt and buckle arrangement, a ratchet band and clasp arrangement, and the like. In fact, the present invention contemplates the use of virtually any adjustment locking means so long as it is capable of forming a wheel rim mask having a desired size, shape and configuration so as to provide the desired masking of a wheel rim.

In order to provide the user with the ability to grip the wheel rim mask, gripping means are provided, such as a pair of holes through which the user can insert his or her fingers therethrough. Alternatively, a handle or other grip device known in the art may be provided.

Although, it will be preferable in most cases for the circumference of the wheel rim mask to correspond as closely as possible to the circumference of the wheel rim to be masked, it is certainly within the scope of the invention to provide a wheel rim mask that either overlaps or falls short of the wheel rim circumference as desired. Thus, to say that a wheel rim mask is adjusted so as to "correspond" to a particular size of wheel rim should be understood to mean that the wheel mask can be adjusted to cover any portion of a wheel rim that the user deems to be desirable. Moreover, the term "cone-shaped" should not be limited to structures that are precisely "cones" in the geometrically rigorous sense, but shall include other cone-like structures or derivatives of cones as well, including but not limited to, frustro-conical structures, warped cones, bell-shaped structures, structures having a parabolic cross-section, and the like. Nevertheless, wheel masks that more closely approximate true cones shall be understood to be the preferred "cone-shaped" mask structures according to the invention.

In a preferred embodiment, the wheel rim mask will comprise a solvent-resistant plastic or polymeric material that is capable of being sprayed numerous times with tire dressing without disintegrating or becoming dimensionally unstable. Nevertheless, it is certainly within the scope of the invention to provide a wheel rim mask of virtually any material so long as it is capable of being adjusted to differently sized wheel rims. For example, the wheel rim mask may comprise a single or laminated material comprising virtually any sheet or sheet-like material, such as plastic, paper, paperboard, metal, fabric, and the like.

Therefore, it is an object of the invention to provide an improved wheel rim protective mask that can be adjusted to protect a plurality of differently-sized wheel rims.

It is an additional object of the invention to provide wheel rim protective masks that can be adjusted both upwardly and downwardly in order to provide protection for both larger and smaller rims once the protective mask has been sized to fit an intermediate-sized rim.

It is a further object and feature of the invention to provide a wheel rim protective mask that can be readily and repeatedly adjusted to fit a variety of differently-sized wheel rims with a minimum of effort.

Finally, it is an important object of the invention to provide a wheel rim protective mask that provides for ease of adjustment but which is capable of masking the entire wheel rim at the same time, and in a single placement step prior to applying tire dressing to the entire wheel.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention involves wheel rim masks that are size adjustable in order to correspond to a particular wheel rim size during application of a tire dressing. The adjustability feature is simple to use with a minimum of effort compared to wheel rim covers that require cutting away the portion that is not needed. Moreover, the wheel rim masks of the present invention are repeatedly adjustable so that once configured to fit a particular wheel rim size, they can be easily reconfigured to fit another wheel rim size. For example, if a person owns two cars, one with a wheel rim diameter of 14 inches, and another with a wheel rim diameter of 15 inches, the user can repeatedly and easily use a wheel rim mask according to the present invention for both cars.

Figure 1:
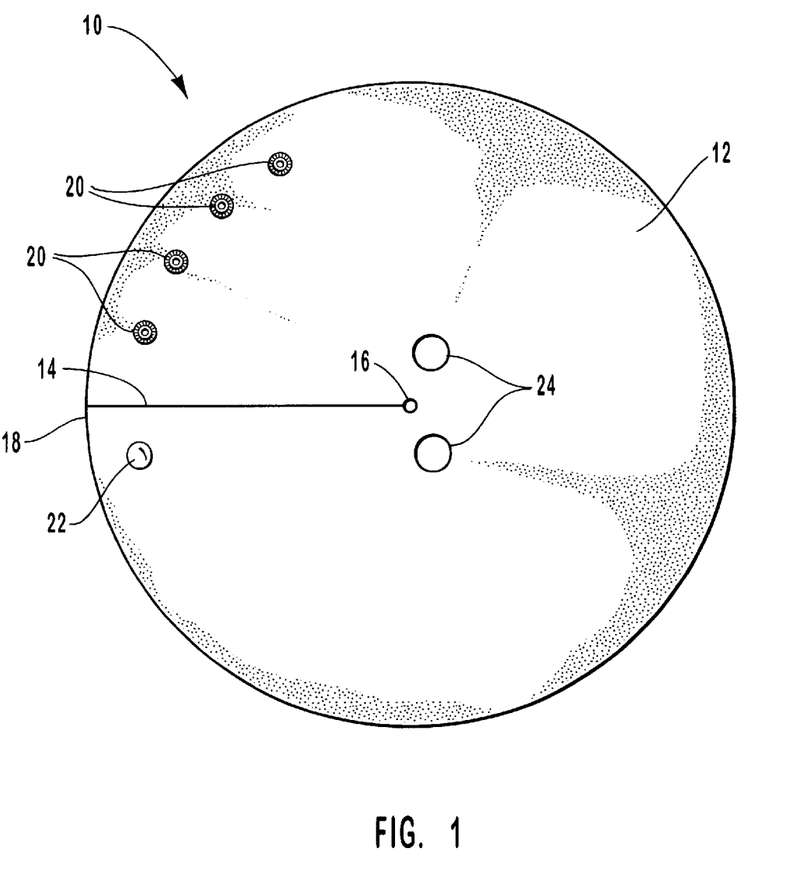
FIG. 1 is a top plan view of a circular wheel rim blank according to the invention in a generally flat, unadjusted configuration.
Figure 2A:
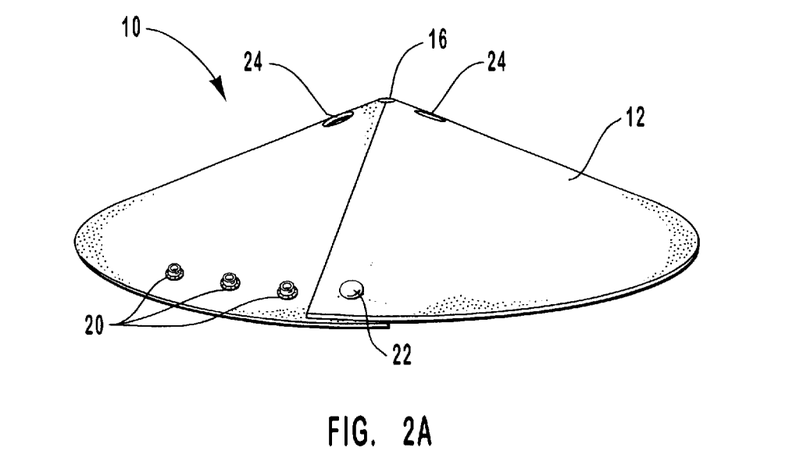
FIGS. 2A–2D is a front perspective view of the circular wheel rim blank of FIG. 1 adjusted and locked into four different cone-shaped wheel rim mask configurations by means of engaging the female snap with one of four possible male snaps.
Figure 2B:
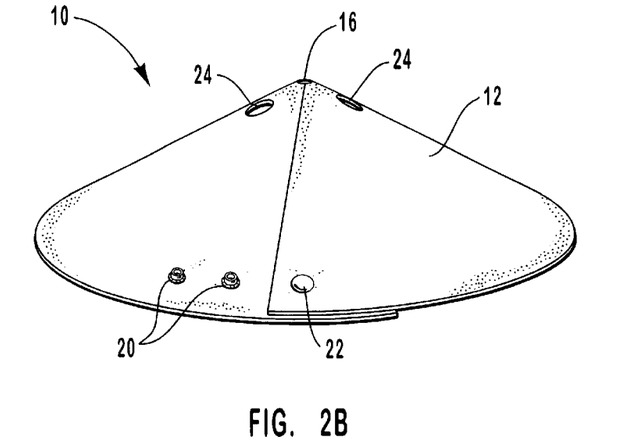
Figure 2C:
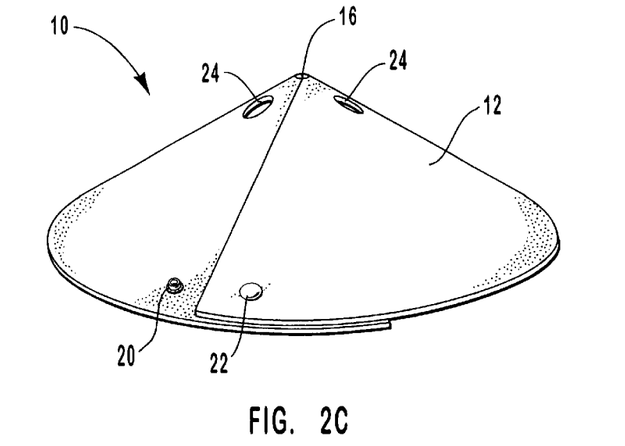
Figure 2D:
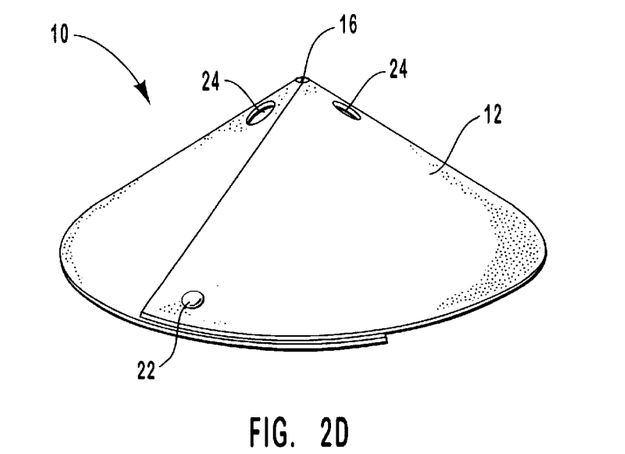

Reference is now made to the drawings, which set forth exemplary wheel rim masks according to the present invention. In particular, FIG. 1 depicts a wheel rim mask 10 initially comprising a substantially flat, circular disk 12. The circular disk 12 is preferably made of a tough, resilient plastic sheet material that is moisture- and chemical-resistant, particularly to chemicals found in tire dressings such as ARMORALL®. The circular disk 12 should be flexible enough to allow, it to be reconfigured from its initially flat and circular configuration to a cone-shaped configuration having a desired circumference and diameter, as will be more fully discussed below with respect to FIGS. 2A–2D.

The circular disk 12 further includes a radial slit 14 extending from a center point 16 to a circumferential edge 18 in order to allow opposing sides of the circular disk 12 on either side of the radial slit 14 to overlap each other in order to form the disk into a cone or cone-shaped configuration. In the alternative, instead of a radial slit, the circular disk 12 may include any radial gap extending from at or near the center point 16 to the circumferential edge 18 which can provide two sides or interior edges of the disk 12 that can be overlapped so as to form a cone-shaped wheel mask structure. For example, the radial gap can be pie-shaped (not shown), curved (not shown), rectangular (not shown), or virtually any shape so long as it allows for overlap, or at least abutment, of the two sides so as to form a substantially cone-shaped wheel mask.

Once the circular disk 12 has been configured or adjusted into a desired cone-shaped configuration, it can be locked in place by means of adjustment locking means for selectively locking the initially circular disk 12 in a desired one of a plurality of alternative and differently-sized cone-shaped configurations. The adjustment locking means may comprise any locking system or lock device known in the art. A presently preferred locking system comprises a plurality of snaps oriented so as to lock the cone-shaped mask in a desired configuration.

As depicted in FIG. 1, the circular disk 12 includes four male snaps 20 arrayed in a desired spaced-apart orientation on one side of the radial slit 14 near the circumferential edge 18. A corresponding female snap 22 is located on an opposite side of the radial slit 14 and disposed at approximately the same distance from the circumferential edge 18 as the male snaps 20. In this manner, the female snap 22 can readily mate and engage a selected one of the male snaps 20 upon reconfiguration of the disk 12 into a desired cone-shaped configuration, while maintaining close proximity of the overlapping portions of the circumferential edge 18. The male and female snaps 20, 22 can be made from any appropriate material, such as metal or plastic, and will preferably be resistant to corrosion or degradation as a result of the application of tire dressing and/or water thereto.

The circumference and effective diameter of the resulting cone-shaped wheel mask will depend on which of the male snaps 20 is engaged by the female snap 22. For example, when using the circular disk 12 depicted in FIG. 1, engaging successive male snaps 20 as one moves away from the radial slit 14 yields successively smaller disk-shaped wheel masks having progressively smaller circumferences and effective diameters. This is illustrated by FIGS. 2A–2D, which depict a series of cone-shaped wheel mask configurations having progressively smaller circumferences and effective diameters as the female snap 22 is mated with successive male snaps 20. Thus, the circumference and effective diameter of the wheel rim masks depicted in Figure B are smaller than those of Figure A. The circumferences and effective diameters of the cone-shaped wheel rim masks of Figures C and D are progressively smaller still.

In order to facilitate gripping of the wheel masks according to the invention by the user, gripping means are provided, an example of which is a pair of holes 24 located near the center of the circular disk 12, as depicted in FIGS. 1 and 2A–2D. Of course, varying the size, shape and orientation of the holes so as to customize the gripping means is certainly within the scope of the present invention. Moreover, gripping means other than holes, such as a handle, may be used. Examples of gripping means that may be employed in conjunction with the size-adjustable wheel rim masks of the present invention are disclosed in the following U.S. Pat. Nos.: 4,811,991; 4,874,206; 4,955,670; 5,423,599; 5,524,972; Des. 305,635; Des. 337,090; Des. 338,152; Des. 379,171; and Des. 387,725. For purposes of disclosing exemplary handles, recesses or other gripping means that may be employed in conjunction with the wheel mask structures of the present invention, or any other ancillary or auxiliary features that are compatible with the adjustable wheel rim masks of the present invention, the foregoing patents are incorporated herein by specific reference.

Figure 3A:
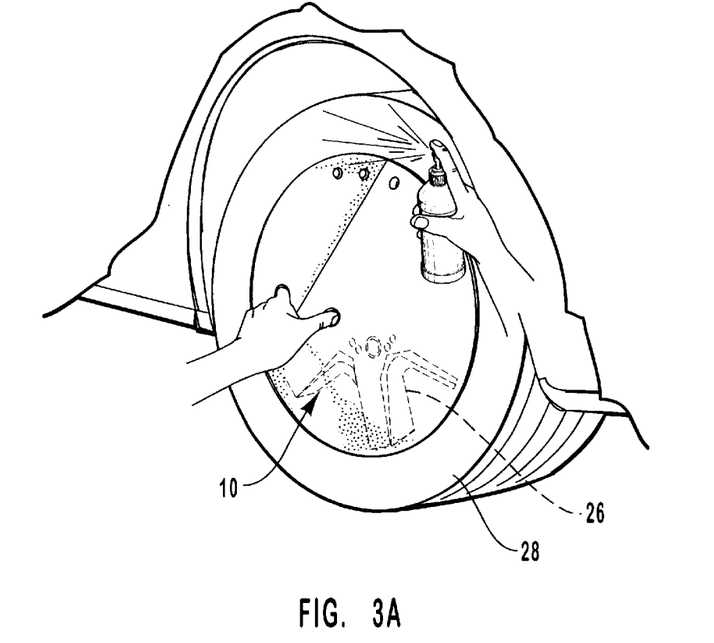
FIGS. 3A and 3B are front perspective views depicting a preferred method of using a wheel rim cover according to the invention in order to protect a wheel rim from overspray during application of a tire dressing.
Figure 3B:
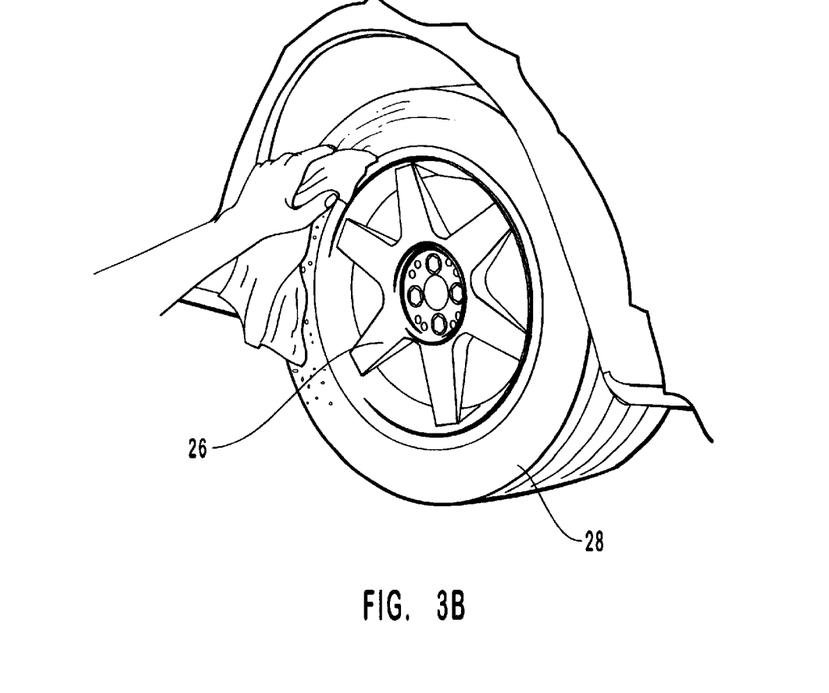
Figure 4A:
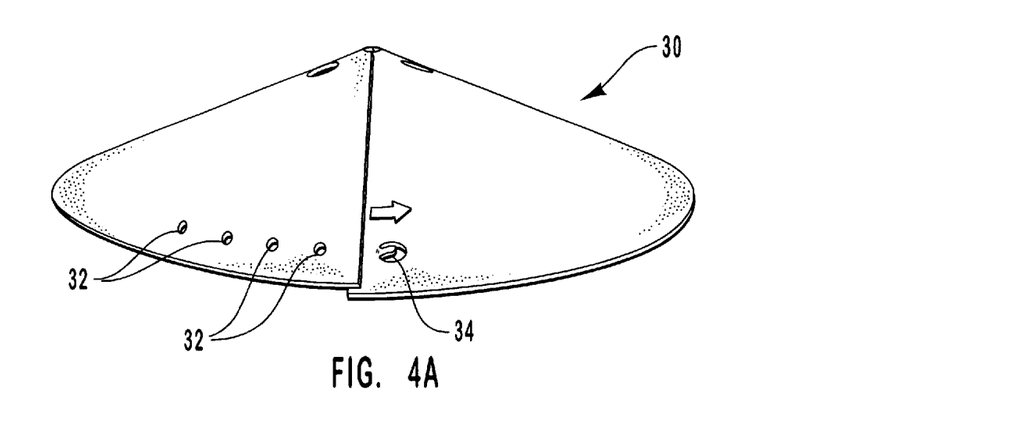
FIGS. 4A and 4B are front perspective views depicting an alternative adjustment locking means comprising a tab and recess system according to the invention.
Figure 4B:
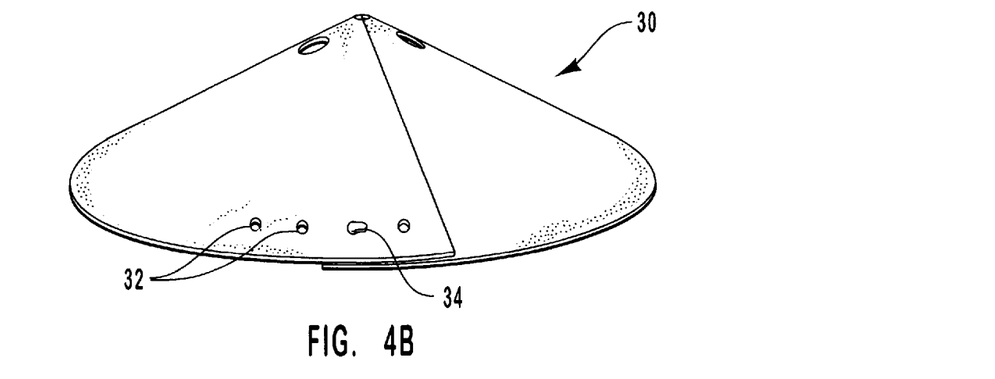

FIGS. 3A and 3B depict an exemplary method of using a wheel rim mask according to the present invention. In this embodiment, the user grips or engages the wheel rim mask 10 with his or her fingers in an appropriate manner and places it over a wheel rim 26, followed by spraying a tire dressing onto a tire 28 surrounding the wheel rim 26. In this manner, the wheel rim mask 10 is able to protect the wheel rim 26 from overspray of the tire dressing. Instead of adhering to the wheel rim 26, any excess tire dressing that results from overspray lands on the wheel rim mask 10, thereby effectively maintaining the cleanliness of the wheel rim 26.

Once the user has applied the desired quantity of tire dressing to the tire 28, the tire dressing can be spread over and rubbed into the tire 28, either before or after removal of the wheel rim mask 10. As depicted in FIG. 3B, the tire dressing is rubbed onto the tire after removal of the wheel rim mask 10 so as to allow for easier distribution of the tire dressing onto the entire tire 28 with as little effort as possible. In the case of gross overspray, in which excessive tire dressing adheres to the wheel rim mask 10, such tire dressing may advantageously be soaked up by a cloth and applied to the tire 28, thus reducing waste.

In many cases, the wheel rim 26 will include a lip or edge protruding laterally from where the tire 28 and wheel rim 26 meet, which can catch or block run-off of the tire dressing applied to the tire 28. This reduces or eliminates the need for continued masking of the wheel rim once the tire dressing has been applied to the tire 28 and prior to wiping with a cloth.

It should be understood that the wheel mask structures according to the invention are not limited to true "cones" in the geometrically rigorous sense, but shall include other cone-like structures or derivatives of cones as well, including but not limited to, frustro-conical structures, warped cones, bell-shaped structures, structures having a parabolic cross-section, and the like. Nevertheless, wheel masks that more closely approximate true cones shall be understood to be the preferred "cone-shaped" mask structures according to the invention.

In order to illustrate other adjustment locking means within the scope of the invention, reference is now made to FIGS. 4–7. FIGS. 4A and 4B depict a "tab and recess" locking system wherein an initially flat, circular disk 30 includes a series of spaced apart holes or recesses 32 on one side of a radial gap and a corresponding tab 34 on another side of the radial gap. As depicted in FIG. 4B, the tab 34 can be inserted into a selected one of recesses 32 in order to provide a desired cone-shaped mask configuration. Because the circular disk 30 will generally comprise a resilient material, it will have a natural spring-back effect that will tend to urge and maintain the tab and selected hole or recess in an interlocked orientation. This, in turn, will tend to maintain the resulting cone-shaped wheel mask in the desired configuration. As with the snaps depicted in FIGS. 1 and 2, the recesses 32 can be provided in the spaced-apart orientation so that, when interlocked with the tab 34, the disk will form a cone-shaped wheel mask having a size corresponding to a desired wheel rim size. Alternatively, a series of tabs in a desired spaced-apart orientation may be provided (not shown), with a locking hole or recess (not shown) corresponding thereto.

Figure 5A:
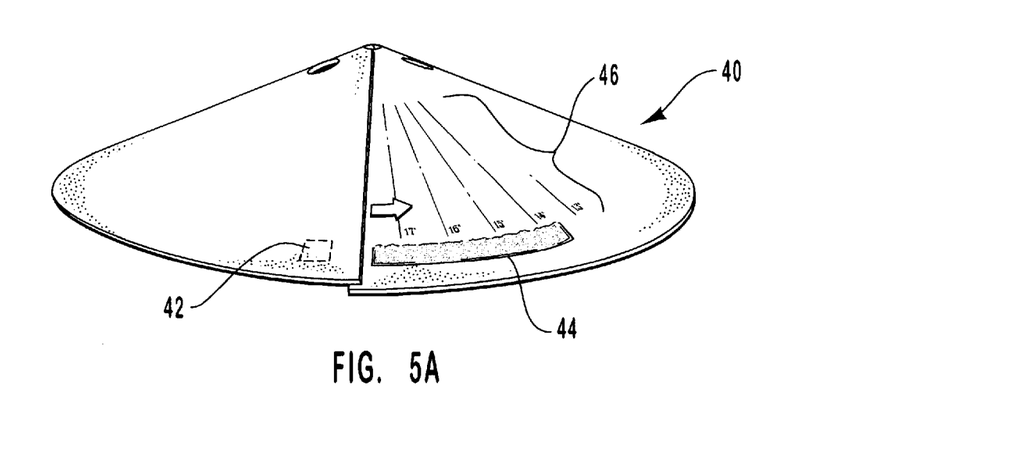
FIGS. 5A and 5B are front perspective views depicting an exemplary "hook and loop" adjustment locking system as another alternative embodiment according to the invention.
Figure 5B:
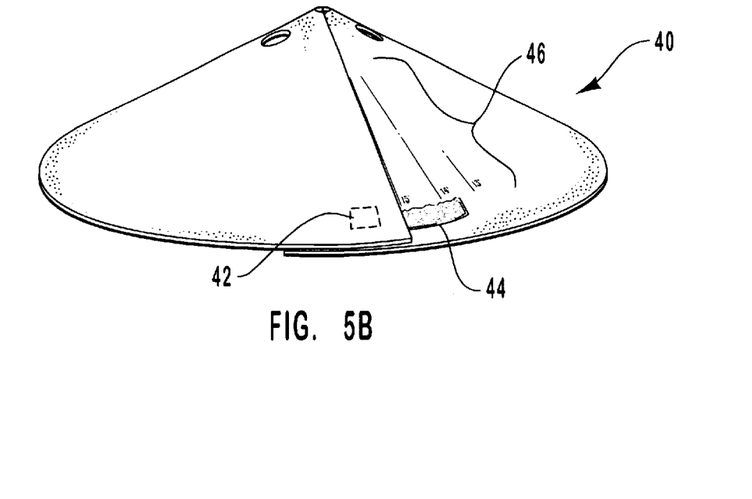

FIGS. 5A and 5B depict yet another alternative embodiment of adjustment locking means according to the invention, namely a "hook and loop" locking system (e.g. VELCRO®). As shown in FIG. 5A, an initially flat, circular disk 40 preferably includes a patch 42 of closely spaced together hooks provided on one surface of the disk 40 and on one side of a radial gap, and a corresponding patch 44 of wool-like loops provided on an opposite surface of the disk 40 and on the other side of the radial gap. Upon overlap of the two sides of the initially flat disk 40 to form a desired cone-shaped wheel mask configuration, the two sides can be locked into a desired orientation by engaging at least a portion of the hook patch 42 with at least a portion of the loop patch 44, as depicted in FIG. 5B.

In contrast to the use of snaps or a "tab and recess" system as disclosed above, a "hook and loop" locking system allows for micro-adjustability of the resulting cone-shaped wheel mask to virtually any size within the range of possible sizes. This facilitates adjustment of the wheel mask to fit odd in-between sizes, such as metric size rims (e.g. 390 mm rims used in older model BMW's). An adjustment guide 46 comprising hash marks or gradient lines depicting various wheel rim diameters may be provided to assist the user in forming a cone-shaped wheel mask corresponding to a desired wheel rim size. As depicted in FIG. 5A, the adjustment guide 46 includes five of such gradient lines in one inch increments corresponding to wheel rim diameters from 13 to 17 inches. Of course, depending on the size of the disk 40, as well as the size and orientation of the "hook and loop" locking system, particularly the hook patch 42 and/or the loop patch 44, the resulting cone-shaped wheel mask structure may correspond to any desired wheel diameter and circumference. It should also be understood that the hook patch 42 may instead comprise a loop patch, while at the same time the loop patch 44 would comprise a corresponding hook patch.

Figure 6:
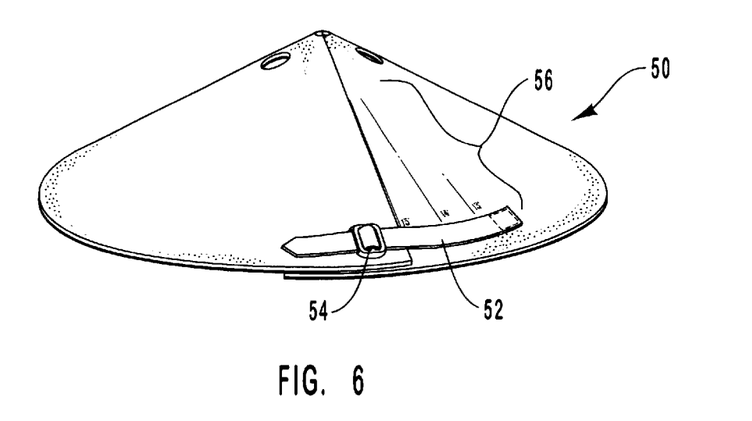
FIG. 6 is a front perspective view depicting a "belt and buckle" adjustment locking system according to the invention.

In yet another embodiment of adjustment locking means according to the present invention, FIG. 6 depicts a "belt and buckle" locking system. More particularly, an initially flat and circular disk 50 includes a locking belt 52 attached to one side of a radial which engages a corresponding belt buckle 54 on an opposite side of the radial gap. The belt 52 may be cinched or loosened as desired in order to adjust the size of the resulting cone-shaped wheel mask in order to protect a variety of wheel rim sizes within the possible size range provided by a particular wheel mask. Because a belt and buckle locking system provides for a wide range of adjustments, an adjustment guide 56 can be provided in order to facilitate adjustment of the wheel rim mask to a desired wheel rim size.

Figure 7:
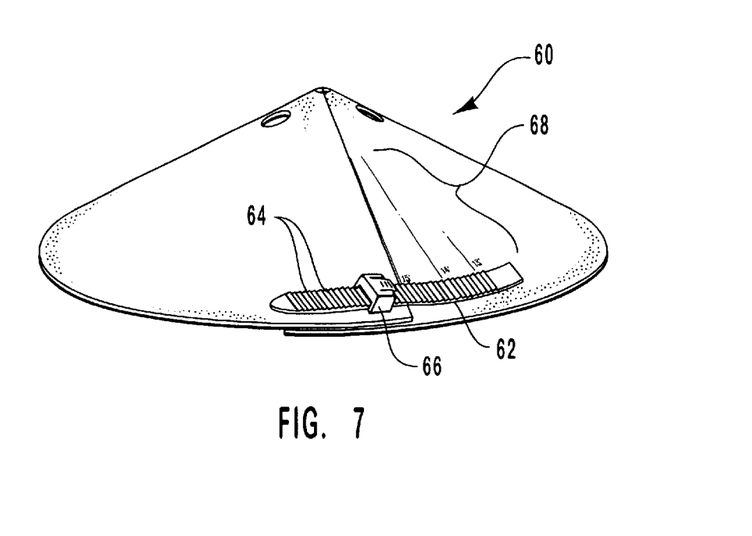
FIG. 7 is a front perspective view depicting a "ratchet band and clasp" locking system according to the invention.

In yet another embodiment of adjustment locking means according to the present invention, FIG. 7 depicts an initially flat and circular disk 60 having a ratchet band 62 which includes individual ratchet teeth 64. The ratchet teeth 64 and ratchet band 62 are configured so as to engage ratchet locking means known in the art, such as may be provided by a ratchet clasp 66. An adjustment guide 68 may also be provided for the reasons discussed hereinabove.

In addition to the foregoing, the adjustment locking means may comprise an adhesive, such as a patch of an adhesive or adhesive tape (not shown) attached to at least one side of the wheel rim mask such as at or near a radial gap within the wheel rim mask.

Although, it will be preferable in most cases for the circumference of the wheel rim mask to correspond as closely as possible to the circumference of the wheel rim to be masked, it is certainly within the scope of the invention to provide a wheel rim mask that either overlaps or falls short of the wheel rim circumference as desired. Thus, to say that a wheel rim mask is adjusted so as to "correspond" to a particular size of wheel rim should be understood to mean that the wheel mask can be adjusted to cover any portion of a wheel rim that the user deems to be desirable.

Because wheel rims typically range anywhere from 13 to 21 inches in diameter for most vehicles, the adjustable wheel rim masks of the present invention may be configured so as to correspond to any or all of the available wheel rim sizes. In most cases, it will be preferable for the wheel rim masks of the present invention to be adjustable to cover at least the most commonly sized wheel rims, such as 14 inch, 15 inch, 16 inch and 17 inch wheel rims.

In a preferred embodiment, the wheel rim mask will comprise a solvent-resistant plastic or polymeric material that is capable of being sprayed numerous times with tire dressing without disintegrating or becoming dimensionally unstable. Nevertheless, it is certainly within the scope of the invention to provide a wheel rim mask of virtually any material so long as it is capable of being adjusted to differently sized wheel rims. For example, the wheel rim mask may comprise a single or laminated material comprising virtually any sheet or sheet-like material, such as plastic, paper, paperboard, metal, fabric, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A wheel rim mask comprising:
   a flexible and resilient sheet that is initially planar and which is capable of being repeatedly reconfigured into a plurality of alternative and differently-sized nonplanar wheel rim mask configurations corresponding to differently-sized wheel rims; and
   locking means, separate from the sheet and attached to at least one side of the sheet, for selectively locking the flexible and resilient sheet in a desired one of the plurality of alternative and differently-sized configurations corresponding to differently-sized wheel rims, wherein the locking means may be selectively locked and unlocked so as to allow the sheet to be repeatedly reconfigured as desired.

2. A wheel rim mask as defined in claim 1, wherein the initially planar sheet is a generally circular disk having a radial gap extending from a central point of the disk to a circumferential edge thereof, the radial gap defining a pair of initially opposing edges that can be overlapped so as to selectively reconfigure the generally circular disk into a desired one of a plurality of generally cone-shaped wheel mask configurations corresponding to a plurality of differently-sized wheel rims.

3. A wheel rim mask as defined in claim 2, wherein the locking means comprises at least one male snap device secured to the generally circular disk on one side of the radial gap and at least one female snap device secured to the generally circular disk on another side of the radial gap.

4. A wheel rim mask as defined in claim 2, wherein the locking means comprises a hook and loop system including at least one patch of hooks on a surface of the generally circular disk on one side of the radial gap and at least one patch of loops on an opposing surface of the generally circular disk on an opposite side of the radial gap.

5. A wheel rim mask as defined in claim 2, wherein the locking means comprises a belt and buckle system including at least one belt attached to the generally circular disk on one side of the radial gap and a at least one corresponding buckle attached to the generally circular disk on another side of the radial gap.

6. A wheel rim mask as defined in claim 2, wherein the locking means comprises a ratchet band and clasp system including at least one ratchet band having ratchet teeth attached to the generally circular disk on one side of the radial gap and a at least one corresponding ratchet clasp attached to the generally circular disk on another side of the radial gap.

7. A wheel rim mask as defined in claim 1, wherein the locking means is arranged so as to selectively and alternatively lock the flexible sheet in a desired one of at least three wheel rim mask configurations corresponding to at least three differently sized wheel rims.

8. A wheel rim mask as defined in claim 1, wherein the plurality of wheel rim mask configurations corresponds to at least two differently sized wheel rims selected from the group consisting of 13 inch rims, 14 inch rims, 15 inch rims, 16 inch rims, 17 inch rims, 18 inch rims, 19 inch rims, 20 inch rims, and 21 inch rims.

9. A wheel rim mask as defined in claim 1, wherein the flexible and resilient sheet comprises a plastic material that is resistant to chemical and physical attack by a tire dressing.

10. A wheel rim mask as defined in claim 1, wherein the flexible and resilient sheet includes at least one of paper, paperboard, and metal.

11. A wheel rim mask comprising:
    a generally circular sheet having a radial gap extending from a central point of the disk to a circumferential edge thereof, the radial gap defining a pair of edges that can be overlapped or abutted so as to selectively reconfigure the generally circular disk into a desired one of a plurality of generally cone-shaped wheel mask configuration corresponding to a plurality of differently-sized wheel rims; and
    at least one lock device separate from the sheet and attached to at least one side of the generally circular sheet which selectively locks the generally circular sheet into a desired cone-shaped wheel mask configuration, wherein the lock device may be selectively locked and unlocked so as to allow the sheet to be repeatedly reconfigured as desired.

12. A wheel rim mask as defined in claim 11, wherein the lock device comprises a plurality of snap devices secured to the generally circular disk on one side of the radial gap and a corresponding snap device capable of selectively mating with each of the plurality of snap devices secured to the generally circular disk on another side of the radial gap.

13. A wheel rim mask as defined in claim 11, wherein the lock device comprises a hook and loop system including at least one patch of hooks on a surface of the generally circular disk on one side of the radial gap and at least one patch of loops on an opposing surface of the generally circular disk on an opposite side of the radial gap.

14. A wheel rim mask as defined in claim 11, wherein the lock device comprises a belt and buckle system including at least one belt attached to the generally circular disk on one side of the radial gap and a at least one corresponding buckle attached to the generally circular disk on another side of the radial gap.

15. A wheel rim mask as defined in claim 11, wherein the lock device comprises a ratchet band and clasp system including at least one ratchet band having ratchet teeth attached to the generally circular disk on one side of the radial gap and a at least one corresponding ratchet clasp attached to the generally circular disk on another side of the radial gap.

16. A wheel rim mask as defined in claim 1, wherein the generally circular sheet comprises a plastic material that is resistant to chemical and physical attack by a tire dressing.

17. A wheel rim mask comprising:

a generally circular sheet having a radial gap extending from a central point of the disk to a circumferential edge thereof, the radial gap defining a pair of edges that can be overlapped or abutted so as to selectively reconfigure the generally circular disk into a desired one of a plurality of generally cone-shaped wheel mask configurations corresponding to a plurality of differently-sized wheel rims, wherein the generally circular sheet comprises a plastic material that is resistant to chemical and physical attack by a tire dressing;

a plurality of first snap devices secured to the generally circular disk on one side of the radial gap; and at least one corresponding snap device secured to the generally circular disk on another side of the radial gap and capable of selectively engaging with each of the plurality of first snap devices so as to maintain the generally circular sheet in a desired cone-shaped wheel mask configuration, wherein the snap devices may be selectively engaged and disengaged so as to allow the sheet to be repeatedly reconfigured as desired.

* * * * *

UNITED STATES PATENT AND TRADEMARK OFFICE
CERTIFICATE OF CORRECTION

PATENT NO.    : 6,485,106 B1                                              Page 1 of 1
DATED         : November 26, 2002
INVENTOR(S)   : Brett Lee Hermansen and Steven Glen Woerkom It is certified that error appears in the above-identified patent and that said Letters Patent is hereby corrected as shown below:

<u>Column 1,</u>
Line 33, after "generally" and before "brake dust" add the sentence -- oil-based, it is not easily washed off from the wheel rim and is known to strongly attract dirt, --

Signed and Sealed this

Fifth Day of August, 2003

JAMES E. ROGAN
*Director of the United States Patent and Trademark Office*